(12) United States Patent
Reding et al.

(10) Patent No.: US 12,162,792 B2
(45) Date of Patent: Dec. 10, 2024

(54) SYSTEMS AND METHODS FOR PROCESSING OPTICAL FIBER

(71) Applicant: CORNING INCORPORATED, Corning, NY (US)

(72) Inventors: Bruce Warren Reding, Corning, NY (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 34 days.

(21) Appl. No.: 18/099,719

(22) Filed: Jan. 20, 2023

(65) Prior Publication Data

US 2023/0234879 A1 Jul. 27, 2023

Related U.S. Application Data

(62) Division of application No. 17/175,000, filed on Feb. 12, 2021, now Pat. No. 11,577,985.

(60) Provisional application No. 62/976,545, filed on Feb. 14, 2020.

(51) Int. Cl.
*C03B 37/027* (2006.01)

(52) U.S. Cl.
CPC ........... *C03B 37/02736* (2013.01); *C03B 37/02718* (2013.01)

(58) Field of Classification Search
None
See application file for complete search history.

(56) References Cited

U.S. PATENT DOCUMENTS

| | | |
|---|---|---|
| 7,937,971 B2 | 5/2011 | Costello et al. |
| 2012/0014654 A1 | 1/2012 | Haruna et al. |
| 2015/0251945 A1 | 9/2015 | Nakanishi et al. |
| 2016/0168008 A1 | 6/2016 | Bookbinder et al. |
| 2017/0073265 A1 | 3/2017 | Bookbinder et al. |
| 2018/0186682 A1 | 7/2018 | Kitamura |
| 2018/0194666 A1 | 7/2018 | Kitamura et al. |
| 2020/0180996 A1 | 6/2020 | Ishida |

OTHER PUBLICATIONS

D. L. Kim et al., "Fictive Temperature of Silica Glass Fiber,—Reexamination", Journal of Non-Crystalline Solids, vol. 286, 2001, pp. 132-138.
International Search Report and Written Opinion of the International Searching Authority; PCT/US2021/017377; dated Jun. 2, 2021; 12 pages; European Patent Office.

*Primary Examiner* — Lisa L Herring
(74) *Attorney, Agent, or Firm* — Yiqun Zhao

(57) ABSTRACT

A system for processing an optical fiber includes: a draw furnace, the draw furnace containing an optical fiber preform; a bare optical fiber drawn from the optical fiber preform, the bare optical fiber extending from the draw furnace along a process pathway; and a slow cooling device operatively coupled to and downstream from the draw furnace, the slow cooling device exposing the bare optical fiber to a slow cooling device process temperature in the range from 1000° C. to 1400° C., wherein the bare optical fiber passes through the slow cooling device at least two times.

10 Claims, 12 Drawing Sheets

SYSTEMS AND METHODS FOR PROCESSING OPTICAL FIBER

CROSS-REFERENCE TO RELATED APPLICATIONS

This application is a divisional of U.S. patent application Ser. No. 17/175,000 filed on Feb. 12, 2021, which claims the benefit of priority under 35 U.S.C. § 119 of U.S. Provisional Application Ser. No. 62/976,545 filed on Feb. 14, 2020, the content of each of which is relied upon and incorporated herein by reference in its entirety.

FIELD OF THE INVENTION

This invention relates to systems and methods for producing optical fibers and more particularly, the invention relates to optical fiber production systems and methods having multiple passes through a slow cooling device.

BACKGROUND OF THE INVENTION

In the manufacturing of optical fibers, optical preforms are heated to temperatures above the glass softening point and then drawn at large draw down ratios to form optical fibers of 125 um in diameter. Due to the high draw temperatures, large draw down ratios and fast draw speeds, the glass is far from the equilibrium state, resulting in a high fictive temperature and hence elevated attenuation. To reduce the fictive temperature and the attenuation in optical fibers, slow cooling of the fibers in the glass transition region and in the sub-$T_g$ region has been used to lower the attenuation in these fibers. However, the residence times where increased relaxation of the glass can be induced, are rather short (e.g. less than 0.2 sec) and only a modest decrease in fictive temperature is achieved.

Accordingly, the inventors have developed improved systems and methods for producing optical fibers.

SUMMARY

Embodiments of systems and methods for producing optical fibers are described herein. In some embodiments, a system (400) for processing a bare optical fiber includes: a draw furnace (402), said draw furnace containing an optical fiber preform (404); a bare optical fiber (406) drawn from said optical fiber preform, said bare optical fiber extending from said draw furnace along a process pathway (408); and a slow cooling device (410) operatively coupled to and downstream from said draw furnace, said slow cooling device exposing said bare optical fiber to a slow cooling device process temperature in the range from 1000° C. to 1400° C., wherein the bare optical fiber passes through the slow cooling device at least two times.

In some embodiments, a method for processing a bare optical fiber includes: drawing a bare optical fiber from an optical fiber preform within a draw furnace, wherein said bare optical fiber extends from said draw furnace along a process pathway; drawing the bare optical fiber through a slow cooling device operatively coupled to and downstream from said draw furnace, wherein said slow cooling device exposes said bare optical fiber to a slow cooling device process temperature in the range from 1000° C. to 1400° C.; and redirecting the bare optical fiber through the slow cooling device at least two times.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope.

Figure 1:
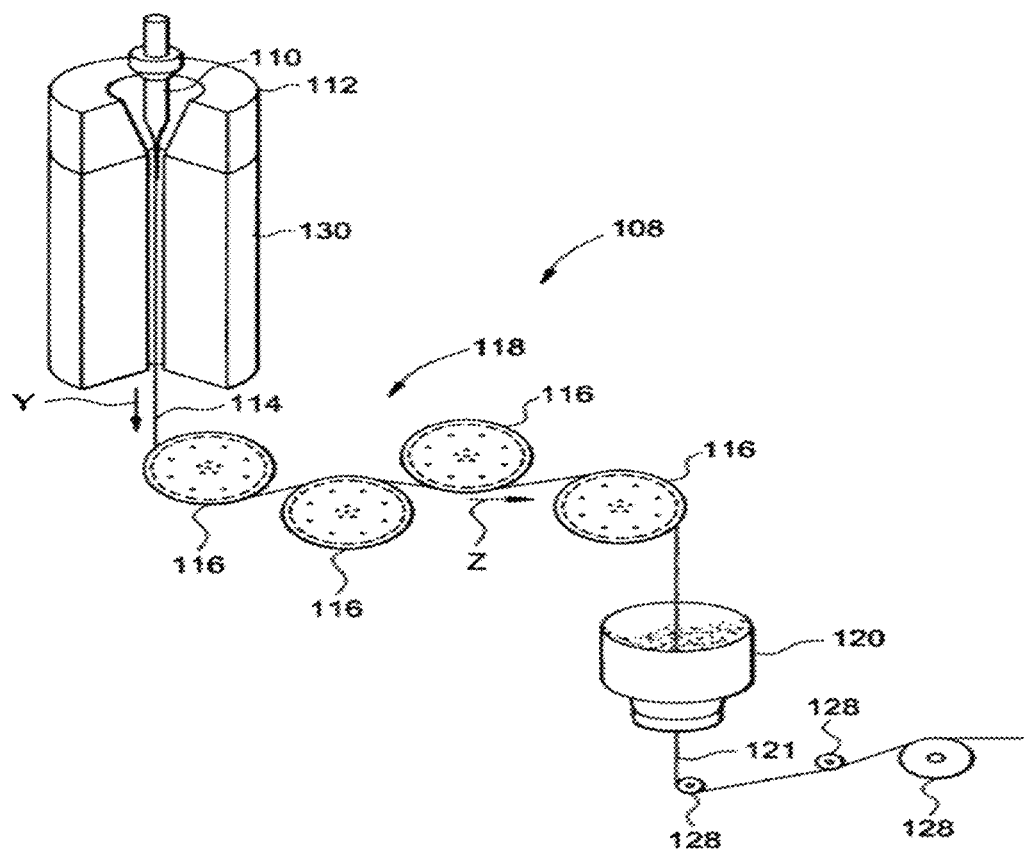
FIG. 1 depicts a system for manufacturing an optical fiber in accordance with some embodiments of the current disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION OF THE INVENTION

For purposes of the present description, the illustrative embodiments relate to silica-based optical fibers. Silica-based optical fibers include fibers made from pure silica, doped silica, or a combination of pure and doped silica. Processing conditions (e.g. temperatures, cooling ranges, cooling rates, draw speeds, etc.) and properties (e.g. fictive temperature, viscosity, attenuation, refractive index, etc.) are stated in reference to silica based optical fibers. As those of skill in the art recognize, however, the principles of the present disclosure extend to optical fibers based on other material systems with due consideration for characteristics of the constituents of other material systems (e.g. melting temperature, viscosity, fictive temperature, time scale for structural relaxation etc.).

The present description provides an optical fiber having low attenuation. The optical fiber is a glass fiber and is processed under conditions that promote more complete structural relaxation of the glass. The more complete structural relaxation leads to a lower fictive temperature for the fiber and reduces the attenuation of the fiber.

In conventional fiber processing, a fiber is formed by heating a glass preform above the softening point and drawing the fiber at large draw down ratios to form optical fibers with the desired diameter. For silica glass fibers, the preform diameter can be on the order of about 100-120 mm or larger and glass fibers drawn from the preform typically have a diameter of 125 μm. To manufacture silica glass fibers, the silica glass preform is heated to a temperature above 2000° C. and fiber is drawn at speeds of 10 m/s or higher. Due to the high draw temperatures, large draw down ratios and fast draw speeds, the glass structure of silica glass fibers is far from equilibrium. Without wishing to be bound by theory, it is believed that the non-equilibrium structure of silica glass fibers is a significant underlying cause of signal attenuation in silica glass fibers. It is accordingly believed that lower attenuation can be achieved in optical fibers by modifying processing conditions to stabilize glass structures that more closely approach the equilibrium structure.

For purposes of the present description, fictive temperature will be used as an indicator of glass structure. Glasses with high fictive temperature have structures that are further removed from equilibrium than glasses with low fictive temperature. Processing conditions that lower the fictive temperature of the glass produce optical fibers with structures that more closely approach equilibrium. Optical fibers with low fictive temperatures are expected to exhibit low attenuation.

The fictive temperature is the temperature at which the glass structure is at equilibrium. It can be measured via IR (infrared) beam measuring methods, using for example the method described in D. L. Kim and M. Tomozawa, "Fictive Temperature of Silica Glass Fiber, —Reexamination," Journal of Non-Crystalline Solids, 286, (2001) 132-138. As described herein, fictive temperature is the average radial fictive temperature of the optical fiber.

In accordance with the present description, processing conditions that extend the period of time in which the fiber is exposed to temperatures in the glass transition region during cooling are shown to facilitate relaxation of the structure of the fiber and to reduce the fictive temperature of the fiber. The glass transition region generally ranges between 1200° C. and 1700° C. for silica glass optical fibers. There may be additional relaxation of the glass below the glass transition region (sub-$T_g$ region), which corresponds to temperatures between 1000° C. and 1200° C. In one embodiment, the temperature window over which cooling facilitates relaxation of glass structure to provide an optical fiber with low fictive temperature ranges from 1000° C. to 1700° C. In another embodiment, the temperature window ranges from 1050° C. to 1600° C. In still another embodiment, the temperature window ranges from 1100° C. to 1500° C.

Optical fibers are generally drawn in air. Cooling rates in air generally exceed 12000° C./sec during the draw process when the fiber is at a temperature above 1000° C., and result in glass fictive temperature of higher than 1550° C. and higher optical fiber attenuation. Some prior art has been reported that discloses drawing of optical fiber in which the optical fiber is exposed to a heated furnace at the draw such that the optical fiber experiences temperatures between 1200° C. and 1700° C. for less than 0.1 seconds and in some cases less than 0.2 seconds. The present description discloses methods of drawing optical fiber in which the optical fibers are maintained at temperatures between 1000° C. and 1700° C. for longer than 0.5 seconds in some embodiments, for longer than 1 second in some other embodiments, and for longer than 2 seconds in still other embodiments. The present methods permit maintaining the fiber at temperatures between 1000° C. and 1700° C. for longer than 0.5 seconds, or longer than 1 second, or longer than 2 seconds for draw speeds greater than 10 m/s, or greater than 20 m/s, or greater than 30 m/s, or greater than 40 m/s, or greater than 50 m/s, or greater than 60 m/s.

FIG. 1 depicts a typical system for producing optical fibers from the prior art. System 108 includes fiber preform 110 situated in furnace 112. Fiber preform 110 is constructed of a glass, such as silica glass, and may include regions of different composition. Preform 110, for example, may include regions of modified and unmodified silica glass with compositions corresponding to the core and cladding compositions desired for fibers drawn from the preform. Fiber preform 110 is heated in furnace 112 and a fiber 114 is drawn therefrom. Fiber 114 enters treatment zone 130 and begins to cool. Fiber 114 exits treatment zone 130 and is directed through a cooling region 118 that includes a series of fluid bearing devices 116. Fluid bearing devices 116 further cool the fiber and direct the fiber to coating unit 120, at which a coating is applied to provide coated fiber 121. After exiting coating unit 120, coated optical fiber 121 may go through a variety of other processing stages within the system that are known in the art (not shown). Drawing mechanisms 128 are used to provide tension on the optical fiber as it is drawn through system 108.

Fluid bearing devices are described in U.S. Pat. No. 7,937,971, the disclosure of which is incorporated by reference herein. A general description of the construction and operation of an illustrative fluid bearing device follows. It should be understood, however, that other designs are possible for the fluid bearing devices and that the benefits achievable by the methods and apparatus disclosed herein are not limited to a particular design for fluid bearing devices.

Figure 2:
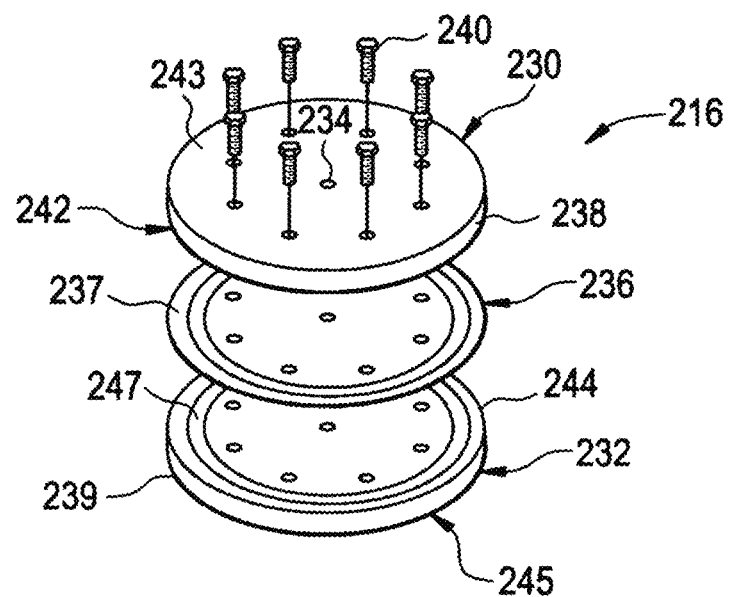
FIG. 2 depicts a fluid bearing device for use in an optical fiber production system in accordance with some embodiments of the current disclosure.
Figure 3:
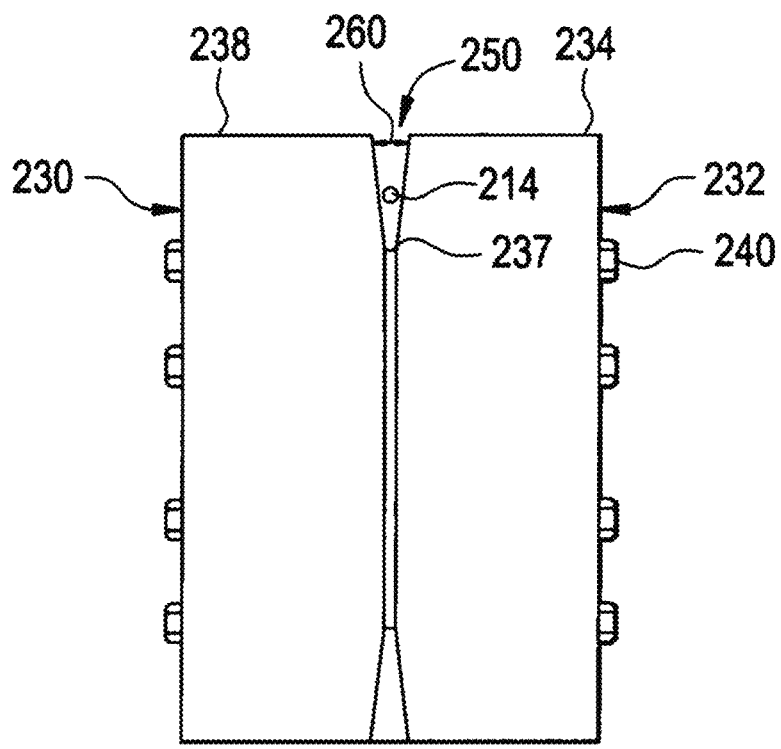
FIG. 3 depicts a fluid bearing device in side view in accordance with some embodiments of the current disclosure.

A typical design for a fluid bearing device is shown in FIGS. 2 and 3. Fluid bearing device 216 in FIG. 2 includes a first plate 230, a second plate 232, an inner member 236 and at least one opening 234 in at least one of the first and second plates. The first plate 230 and the second plate 232 can be made of metal and include arcuate outer surfaces 238 and 239, respectively. The first plate 230 and the second plate 232 are connected by fasteners (e.g., bolts 240) to link the plates 230, 232 together so that fluid may be passed through the bearing assembly 216. The arcuate outer surfaces 238, 239 of each plate 230, 232 generally lie along the circumference of each of the respective plates 230, 232. The first plate 230 and the second plate 232 each have respective inner 242, 244 and outer faces 243, 245, wherein the inner faces 242, 244 of the plates 230, 232 are aligned with each other. A recessed portion 247 extends at least partially around the inner faces 242, 244 of either the first plate 230 or the second plate 232 to provide a plenum for fluid flow. In another embodiment, the recessed portion may comprise a variety of configurations to provide uniform flow into fiber support channel 250, as discussed later herein.

In the embodiment illustrated in FIG. 2, the arcuate outer surfaces 238, 239 of the first plate 230 and the second plate 232 are preferably substantially aligned and form a region between the outer surfaces 238, 239 of both the first plate 230 and the second plate 232. This region is configured to receive an optical fiber so that optical fiber can travel along this region without rotation of the bearing assembly. This fiber support channel 250 is more clearly illustrated in the embodiment shown in FIG. 3 (discussed later herein). At least one opening 234 passes through at least one of the first plate 230 and the second plate 232. As shown in FIG. 2, the opening 234 of the first plate 230 and the second plate 232 allow for a fluid (e.g., air, helium or other desired gas or liquid) to be fed through the fluid bearing device 216 from opening 234 to the fiber support channel 250 that is formed between the first plate 230 and the second plate 232. As described more fully hereinbelow, the fluid supplied to channel 250 creates a high-pressure region between the fiber and the surface of channel 250. The fluid, in combination with the tension driving the draw, acts to stabilize the fiber in channel 250 and to position the fiber above the surface of channel 250 to prevent mechanical contact of the fiber with the fluid bearing device. The fluid passed through the fluid bearing device may be referred to herein as a levitating fluid. The levitating fluid may be a gas or liquid. Representative levitating fluids include air, N2, and inert gases.

In addition, the fluid bearing device 216 may include an inner member 236 positioned between the first plate 230 and the second plate 232. The inner member 236 (e.g., a shim 237) is configured to aid in directing the levitating fluid to the region between the outer surfaces 238, 239 of the first plate 230 and the second plate 232 such that the levitating fluid exits the fiber support channel 250 having a predetermined flow direction. The inner member 236 rests between the first plate 230 and second plate 232 to provide a gap there between. If desired, inner member 236 can comprise a plurality of fingers (not shown) to further control fluid flow by suppressing non-radial flow. In addition, the inner member 236 serves as a sealing portion to provide substantial contact between the first plate 230 and the second plate 232. Inner member may also include notches to facilitate entry and exit of the optical fiber.

As shown in FIG. 3, the fiber support channel 250 formed between the outer surfaces 238, 239 of the first plate 230 and the second plate 232 can be tapered where the levitating fluid exits between the first plate 230 and the second plate 232. In another embodiment however, fiber support channel 250 may include a parallel or reverse tapered shape, for example. In addition, the opening 260 within the tapered fiber support channel 250 is variable depending on where the optical fiber 214 is positioned. Preferably, the opening 260 and the fiber support channel 250 are configured so that, for the particular draw tensions and draw speeds employed and flow rates of the levitating fluid through the opening 260, the optical fiber is maintained in a section of fiber support channel 250 which is less than 500 μm, more preferably less than 400 μm, even more preferably 300 μm, and most preferably less than 200 μm wide, for a fiber having a typical outer diameter of 125 μm. Thus, the fiber is preferably retained within a region of the channel 250 which is between 1 and 2 times the diameter of the fiber, more preferably between 1 and 1.75 times the diameter of the fiber, and most preferably between 1 and 1.5 times the diameter of the fiber. Preferably, the fiber is located within a region of said channel such that the distance between the outer fiber and each wall is between 0.05 and 0.5 times the fiber diameter.

In the embodiment illustrated in FIG. 3, for ease of viewing, the tapered angle has been exaggerated in the illustration from what is a preferred angle of taper opening to fiber support channel 250. In reality, at least one of and preferably both of the opposing surfaces of support channel 250 are each inclined, preferably at an angle greater than 0° and less than 10°, more preferably between 0.3° and 7°, and most preferably between 0.4° and 3°, so that the width 260 of the top or outer portion of fiber support channel 250 is wider than the width 260 of the bottom or inner portion 237 of fiber support channel 250. For example, in such an embodiment, the first plate 230 and the second plate 232 forming the region may be inclined at an angle of −0.6° and +0.6°, respectively. Alternatively, fiber support channel 250 may comprise any depth, width or tapered angle. By utilizing a tapered fiber support channel 250 and injecting the fluid into the slot formed by fiber support channel 250 so that the fluid enters the narrower inner portion of fiber support channel 250 and exits the wider outer region of fiber support channel 250, the cushion of levitating fluid emitted through channel 250 will cause the fiber to be self-locating within the depth of the channel 250. For example, for a given rate of flow of the levitating fluid, if the fiber draw tension is increased, the fiber will move downward in the channel 250 until the gaps between the fiber 214 and channel walls are small enough that the pressure in region 237 is high enough to correctly counteract the new higher tension. If the fiber draw tension is decreased, the fiber will move upwardly within the channel 250 until the gaps between fiber 214 and channel walls are large enough that the pressure in region 237 is small enough to counteract the new, lower tension. Tapering the channel 250 thus enables the channel 250 to work with a wider range of draw tensions. Otherwise, if channel 250 as shown was not tapered and the draw tension was decreased, the fiber may travel upward and out of fiber support channel 250.

Preferably, the fiber is located in an area of the channel 250 that is between about 1 and 2 times the fiber diameter, more preferably between about 1 and 1.75 times the fiber diameter, most preferably between about 1 and 1.5 times the fiber diameter. By locating the fiber in such a relatively narrow region in channel 250, the fiber will center itself during operation due to the Bernoulli effect. For example, as the fiber gets closer to either opposing surface of channel 250, the velocity of the levitating fluid will increase nearest one surface and decrease nearest the other. According to the Bernoulli effect, an increase in levitating fluid velocity occurs simultaneously with a decrease in pressure. As a result, the greater pressure caused by the decreased levitating fluid flow near one surface will force the fiber back into the center of channel 250. Thus, in the preferred embodiments, the fiber is centered within the fiber support channel 250 at least substantially via the Bernoulli effect due to a stream of levitating fluid that is passing around the fiber and out of the fiber support channel 250 while the fiber is being drawn. Notably, such centering occurs without having to utilize any flow of levitating fluid that would impinge upon the fiber from the side thereof, e.g., there are no jets of levitating fluid emanating from sidewalls of channel 250. The velocity of the stream of levitating fluid traveling through the slot is preferably adjusted to maintain the fiber so that the fiber is located entirely within a tapered region of the slot 250. In the embodiment of FIG. 3, because the fiber is located in an area of the channel 250 that is between about 1 and 2 times the fiber diameter, the fiber is supported by a pressure difference that exists below the fiber 214 (rather and as opposed to aerodynamic drag which might also be used to support a fiber, if one so chose). By supporting or levitating the fiber within channel 250 via a fluid pressure differential, much lower fluid flows can be employed than if aerodynamic drag was used to levitate the fiber.

In the embodiment illustrated in FIG. 3, the fluid stream is preferably provided by a single levitating fluid stream that enters fiber support channel 250 via the narrower inner portion of fiber support channel 250 and exits via the wider outer region 260 of fiber support channel 250. In this way, the fiber can be positioned entirely within the slot formed by fiber support channel 250 such that the fiber floats between the narrowest and widest portion of the slot. By employing a tapered fiber support channel 250 and injecting the levitating fluid through the region 250 in this manner, it is possible to retain a fiber in a region of said slot formed by fiber support channel 250 wherein the slot has a width that is between 10 μm to 150 μm, more preferably between 15 μm and 100 μm, and most preferably between about 24 μm 70 μm greater than the diameter of the fiber being directed through the fiber support channel 250. During the fiber draw process, the fiber is also preferably retained within a region of the channel such that the distance between the outer fiber and each wall is between 0.05 and 0.5 times the fiber diameter.

In some preferred embodiments, fiber support channel 250 is provided with a means for reducing pressure under the fiber as the fiber moves outwardly away from the source of the levitating fluid flow. Such a means for releasing pressure can be achieved in the form of a tapered channel design, as described above.

The fluid bearing devices enable the optical fiber to travel along the region of levitating fluid cushion so as to prevent or substantially prevent actual mechanical contact between the optical fiber and the bearing assembly, e.g., the fiber travels within fiber support channel 250 without contacting either of plates 230 or 232. In addition, because of the size and configuration of the region, the fluid bearing device is capable of maintaining the fiber within the region without mechanical contact through a range of draw tensions without active control of the levitating fluid flow.

The levitating fluid flow can be important to prevent the optical fiber 214 from moving towards the bottom of the fiber support channel 250 and coming in contact with the shim 237 or the sides of the fiber support channel 250. This is particularly important when the optical fiber is still uncoated so that the fiber quality is not compromised by the mechanical contact with the fluid bearing device or channel 250. Moreover, it is believed the closer the optical fiber 214 is positioned relative to the bottom of the fiber support channel 250, the higher the pressure needs to be within the fiber support channel 250 to maintain the optical fiber 214 at the desired location. As is evident, the taper in channel sides will cause the gaps between the channel sides and the fiber to be smaller, causing this necessary higher pressure.

Other factors influencing fiber position within fiber support channel 250 include the draw tension. For example, fiber pulled with 200 g of tension will float lower within fiber support channel 250 than fiber pulled with a tension of 100 g given the same fluid flow. As such, it is important that the flow of levitating fluid exiting the region of the fluid bearing be sufficient to maintain the optical fiber at the desired location for the particular fiber draw speed and draw tension employed.

For example, in an embodiment that utilizes a fiber support channel 250 having a width of about 127 μm at the innermost section between plates 230 and 232 and approximately 380 μm at the outermost section, the levitating fluid flow rate can be from about 0.5 L/sec to more than 5 L/sec. Such a configuration and flow of levitating fluid can result in local fluid velocities around the optical fiber of up to 800 km/hour or higher. Thus, in some embodiments the maximum levitating fluid velocities around the fiber employed in the fiber support channel 250 are higher than 100 km/hr, higher than 200 km/hr, higher than 400 km/hr, and possibly even higher than 600 km/hr. In some embodiments, maximum levitating fluid velocities around the fiber employed in the fiber support channel 250 may be higher than 900 km/hr. However, the methods disclosed herein are certainly not limited to these velocities, and in fact the velocity preferably can be chosen to result in the fiber being located at a desired location within fiber support channel 250, depending on draw conditions (e.g. draw speed, draw tension, etc.) and fluid bearing design. In another embodiment, the flow rate of levitating fluid can be from about 3 L/sec to about 4 L/sec. Of course, any rate of flow of levitating fluid sufficient to maintain the optical fiber at the desired location at a given draw tension can be utilized.

One of the drawbacks of system 108 shown in FIG. 1 is that the rate of cooling of the fiber is high when using the high draw speeds desired for manufacturing. Cooling rates of 12,000° C./sec or higher are encountered under conditions typically used to manufacture optical fibers, that is, during the draw process when the fiber is at a temperature above 1000° C. The high cooling rates lead to fibers having high fictive temperatures (about 1500° C.) and high attenuation.

A possible strategy for decreasing the cooling rate is to increase the temperature of treatment zone 130 to more closely match the temperature of the fiber as it enters treatment zone 130. A lower temperature difference between treatment zone 130 and furnace 112 would lower the cooling rate of the fiber. In principle, treatment zone 130 could include a temperature gradient that permits gradual cooling of the fiber from its entrance temperature (1500° C. or above) to lower temperatures in such a way that the residence time of the fiber in the 1000° C.-1700° C. range is sufficiently long to achieve the structural relaxation needed to lower fictive temperature as described herein. Alternatively, the fiber processing system might include multiple treatment zones operated at progressively decreasing temperatures to cool the fiber while prolonging the residence time of the fiber in the preferred 1000° C.-1700° C. temperature window.

Although conceptually viable, strategies for controlled cooling of the fiber that involve adjustments of the conditions of treatment zone 130 are difficult to implement in practice. In order to control cooling of the fiber to best facilitate the structural relaxation needed to achieve low fictive temperature, it is necessary to maximize the time at which the temperature of the fiber is in the preferred 1000° C.-1700° C. temperature window identified herein. When the prior art fiber processing system shown in FIG. 1 is operated at commercial draw speeds, the time at which the fiber temperature is in the 1200° C.-1700° C. temperature window is limited to about 0.2 sec. This time is too short to permit significant structural relaxation of the glass and the fictive temperature of fiber produced from the system is accordingly high (about 1500° C.). In order to increase the residence time between 1000° C. and 1700° C., it is necessary to control the temperature of treatment zone 130 to reduce the rate of cooling. As noted hereinabove, proper control of the temperature requires a more gradual reduction in the temperature of the fiber to ensure an adequate residence time of the fiber in the 1000° C.-1700° C. temperature window. As the reduction in temperature becomes more gradual, however, the length of treatment zone 130 increases. To establish the gradual controlled cooling necessary to reduce the fictive temperature of the fiber meaningfully below 1500° C. at commercial draw speeds, the required length of treatment zone 130 would exceed the vertical headspace (floor-to-ceiling) available in most production facilities. Modification of existing facilities to accommodate greater vertical headspace would increase the cost of production to an unreasonable degree. An alternative approach of reducing draw speed within existing limits of vertical headspace is also undesirable because it leads to higher costs through lower manufacturing throughput.

Incorporation of fluid bearing devices into the fiber processing system is advantageous because they enable redirection of the fiber during processing in a horizontal or other non-vertical direction. By incorporating fluid bearing devices into the system, the path length available for fiber processing can be increased without a need to increase vertical space in the facility. In system 108 shown in FIG. 1, fluid bearing devices 116 redirect uncoated fiber 114 from a vertical direction to a more nearly horizontal direction as uncoated fiber 114 exits treatment zone 130. In the configuration shown in FIG. 1, fluid bearing devices 116 deliver uncoated fiber 114 to coating unit 120. In an alternative configuration, the fiber processing system could be modified to include a second treatment zone parallel to the treatment zone 130 and the fiber bearing devices could redirect the fiber in a vertically upward direction to deliver the fiber to the second treatment zone to further extend the path of cooling in an attempt to slow the cooling rate to a degree sufficient to produce fibers with lower fictive temperature.

In the system configuration of FIG. 1, however, fluid bearing devices 116 are counterproductive to the objective of achieving fibers with low fictive temperature. Instead of enabling controlled cooling at slow rates, fluid bearing devices 116 as deployed in FIG. 1 facilitate rapid cooling of the fiber. As the optical fiber 114 is transported over the fluid bearing devices 116, the region of levitating fluid cushion on each fluid bearing device 116 acts to cool the optical fiber 114. Because the levitating fluid stream employed by the fluid bearing device to support and seat the fiber is in motion, the optical fiber is cooled at a rate that is faster than the fiber would cool in quiescent air at room temperature. The greater the temperature differential between the optical fiber and the levitating fluid in the fluid bearing, the greater the ability of the levitating fluid bearing to cool the optical fiber 114. In the deployment of FIG. 1, the levitating fluid supplied to fluid bearings 116 is air or an inert gas at room temperature. As described hereinabove, in order to support and levitate the fiber to prevent mechanical contact of the fiber with the fluid bearing device, the velocity of the levitating fluid supplied to channel 250 is high. The use of such high levitating fluid flow velocities greatly increases the rate of cooling of the fiber through convective processes. The larger the difference between the temperature of the fiber and the temperature of the levitating fluid being supplied by the fluid bearing device, and the higher the levitating fluid flow velocity, the faster the rate of cooling of the fiber.

In the fiber processing systems of the prior art, the levitating fluid supplied by fluid bearing devices is at room temperature and the fiber exiting the treatment zone and entering the assembly of fluid bearing devices is typically at a temperature of 500° C. or higher, and more typically at a temperature of 1000° C. or higher. At typical fiber draw speeds and typical levitating fluid velocities through the fluid bearing device, the temperature of the fiber can be reduced by several hundred to over 1000° C. over a length of 1-2 meters as the fiber passes over a fluid bearing device. The fast fiber cooling rates provided by the fluid bearing devices as deployed in the prior art have been viewed as beneficial because they may simplify fiber processing systems by obviating the need for helium cooling devices.

While the prior art has recognized rapid cooling of the fiber with fluid bearing devices as advantageous, the present description recognizes that the timescale over which fiber cooling occurs is far shorter than the times needed to facilitate the structural relaxation necessary to achieve low fiber fictive temperature and produce fibers with low attenuation. The present description provides a new processing system designed to provide fibers with low fictive temperatures. The system includes fluid bearing devices for altering the path of the fiber through the processing system and is designed to prolong the residence time of the fiber at temperatures in the range from 1000° C. to 1700° C. to larger than 0.5 seconds in some embodiments, to larger than 1 second in some other embodiments, to larger than 2 seconds in still other embodiments and larger than 5 seconds in yet other embodiment, and larger than 10 seconds in further embodiments. The prolonged residence times may be achieved at process draw speeds of greater than 10 m/s, or greater than 20 m/s, or greater than 30 m/s, or greater than 40 m/s, or greater than 50 m/s, or greater than 60 m/s.

The present system overcomes two aspects of the prior art system shown in FIG. 1 that are detrimental to the objective of achieving fibers with low fictive temperature. First, unlike the prior art system, the present system extends the period of time in which the fiber is exposed to temperatures in the glass transition region during cooling to facilitate relaxation of the structure of the fiber and to reduce the fictive temperature of the fiber. Second, unlike the prior art system, the present system positions the fluid bearing devices within a heated enclosure.

Figure 4:
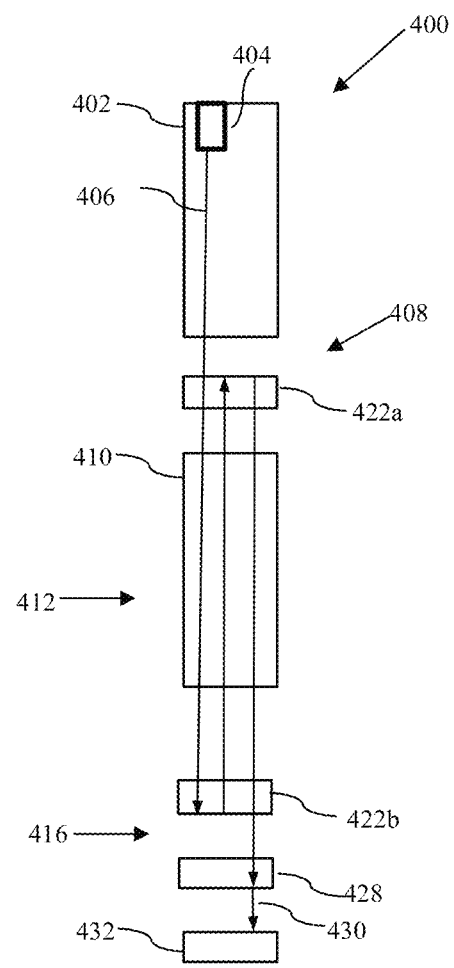
FIG. 4 illustrates an exemplary optical fiber production system in accordance with some embodiments of the current disclosure.

FIG. 4 depicts an exemplary system 400 for processing a bare optical fiber in accordance with some embodiments of the current disclosure. The phrase "bare optical fiber" as used herein means an optical fiber directly drawn from a preform and prior to applying a protective coating layer to its outer surface (e.g., prior to the bare optical fiber being coated with a polymeric based material).

The system 400 comprises a draw furnace 402. The draw furnace contains an optical fiber preform 404. A bare optical fiber 406 is drawn from said optical fiber preform 404. The fiber preform 404 is constructed of a glass, such as silica glass, and may include regions of different composition. Optical fiber preform 404, for example, may include regions of modified and unmodified silica glass with compositions corresponding to the core and cladding compositions desired for fibers drawn from the preform. The fiber preform 404 is heated in a furnace 402 and the bare optical fiber 406 drawn therefrom extends from the draw furnace 402 along a process pathway 408.

In some embodiments, the bare optical fiber is drawn from the optical fiber preform at a speed greater than 10 m/s, or in some embodiments greater than 20 m/s, or in some embodiments greater than 30 m/s, or in some embodiments greater than 40 m/s, or in some embodiments greater than 50 m/s, or in some embodiments greater than 60 m/s.

A slow cooling device 410 is operatively coupled to and downstream from the draw furnace 402 along a first segment 412 of the process pathway 408. The slow cooling device 410 exposes the bare optical fiber to a process temperature in the range from 1000° C. to 1400° C. The process temperature is the temperature within the processing region of the slow cooling device. As defined herein, a slow cooling device provides controlled cooling of an optical fiber at a rate that is slower than the cooling rate of the optical fiber in unheated air. In some embodiment, a slow cooling device includes one or more zones with controlled temperatures. For example, a slow cooling device may include a furnace with one or more temperature control zones. The controlled temperatures permit more gradual cooling of the optical fiber relative to cooling in unheated air and can be designed to increase the residence time of the fiber at desired process temperatures or in desired process temperature windows, thereby facilitating the goal of reducing the fictive temperature of fiber during cooling. In another embodiment, a slow cooling device operates under sub-atmospheric pressure conditions. Reduction of the pressure of the gas environment surrounding the fiber permits more gradual cooling of fiber relative to cooling at atmospheric pressure by reducing the rate of heat transfer from the fiber to the gas atmosphere, thereby facilitating the goal of reducing the fictive temperature of fiber during cooling.

The present invention provides increased residence time in the glass transition region by redirecting the optical fiber through the same slow cooling device multiple times prior to a protective coating being applied thereto. In some embodiments, the optical fiber is directed through the same slow cooling devices at least two times. In some embodiments, the optical fiber is directed through the same slow cooling devices at least three times. In some embodiments, as depicted in FIG. 4, the bare optical fiber is redirected through the slow cooling device 410 via at least two a fluid bearing devices 422a, 422b that are operatively coupled to and downstream from the draw furnace 402 along a first segment 412 of the process pathway 408. The fluid bearing devices 422a, 422b redirect the bare optical fiber 406 through the slow cooling device 410. Within the slow cooling device 410, the bare optical fiber 406 is exposed to a process temperature in the range from 1000° C. to 1400° C. In some embodiments, the bare optical fiber 406 is exposed to a process temperature for a residence time of at least 0.4 seconds, preferably a residence time of 0.5 seconds, more preferably a residence time that is at least 1.0 second, and more preferably a residence time that is at least 2.0 second. The "residence time" refers to the total amount of time that the bare optical fiber is within processing region of the slow cooling device 410. In some embodiments, the optical fiber has a temperature within the slow cooling device of 1000° C. to 1700° C. for at least 0.2 seconds, preferably 1000° C. to 1700° C. for at least 0.5 seconds, preferably 1000° C. to 1700° C. for at least 1 second, more preferably 1000° C. to 1700° C. for at least 2 seconds.

Figure 7A:
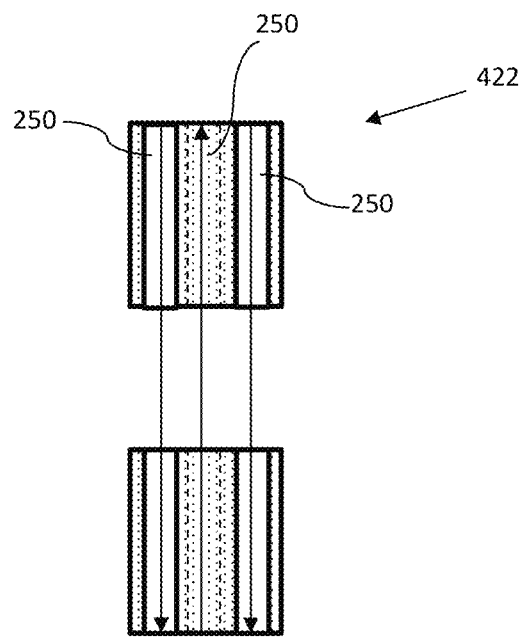
FIG. 7A-7B depicts a fluid bearing device for use in exemplary optical fiber production systems depicted in FIGS. 4-6 in accordance with some embodiments of the current disclosure.
Figure 7B:
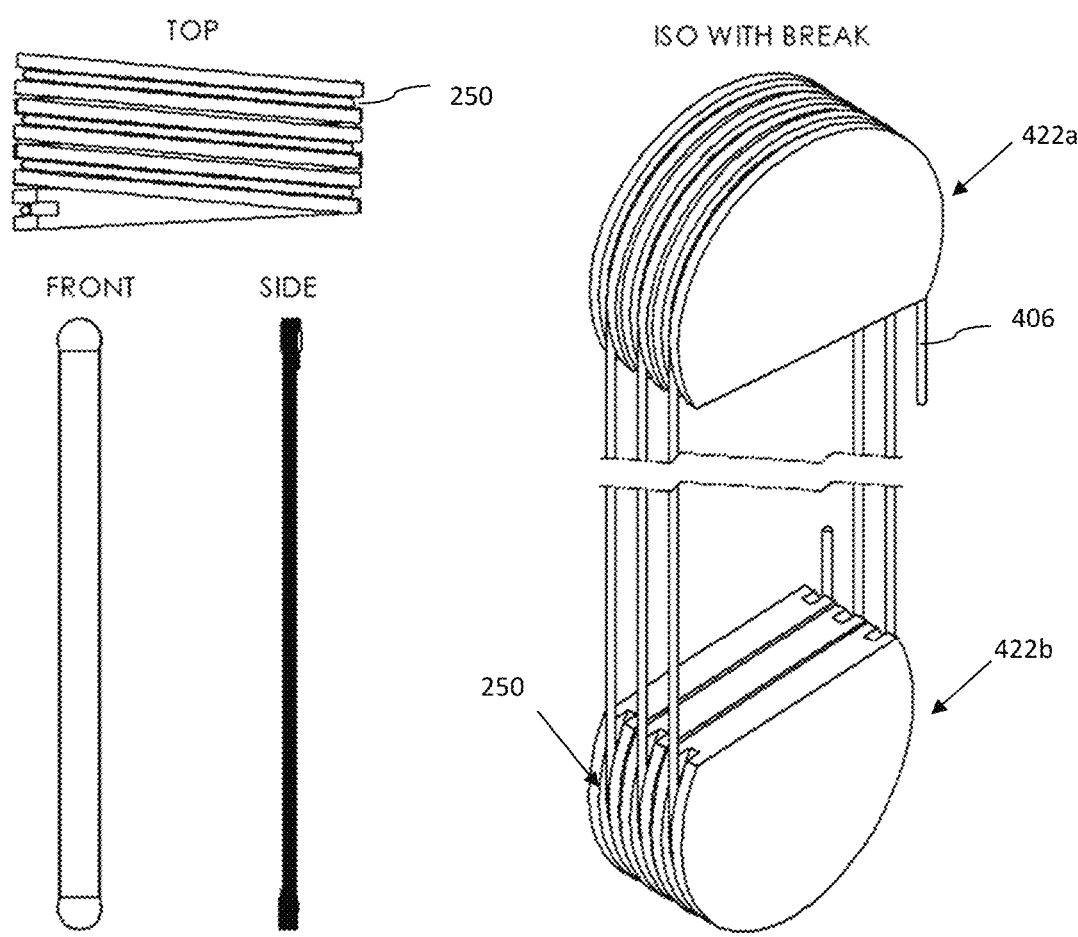

The fluid bearing devices 422a, 422b each contain multiple fiber support channels 250. In some embodiments, the fluid bearing devices 422a, 422b may be multiple fluid bearing devices, as discussed above and shown in FIG. 2 and FIG. 3, coupled together and/or positioned within a singular housing. In some embodiments, the fluid bearing devices 422a, 422b comprise an integrally formed body (i.e. a unitary or one-piece construction body) having multiple fiber support channels 250 as described above. FIG. 7 depicts an exemplary fluid bearing device having three fiber support channels 250. The number of fiber support channels depicted is exemplary. A fluid bearing device 422 may have more or less fiber support channels than depicted in the exemplary figures so as to redirect the bare optical fiber through the same slow cooling device, for example, at least two times.

In some embodiments, the bare optical fiber is heated after the bare optical fiber is redirected by the fluid bearing device and prior to the bare optical fiber reentering the slow cooling device. In some embodiments, the bare optical fiber is heated by at least 500° C., preferably by at least 800° C. after the bare optical fiber is redirected by the fluid bearing device and prior to the bare optical fiber reentering the slow cooling device In some embodiments, the temperature of the fluid bearing device is room temperature (about 25 degrees Celsius). In some embodiments, the temperature of the fluid bearing device is between 5° C. and 450° C. In some embodiments, the temperature of the fluid in the fluid bearing device is between 5° C. and 200° C. In some embodiments, the temperature of the fluid in the fluid bearing device is between 400° C. and 1200° C. In some embodiments, the fluid bearing device is disposed within a heated enclosure. In some embodiments, the optical fiber is exposed to a process temperature above 400° C. within the fluid bearing device. In some embodiments, the optical fiber is exposed to a process temperature above 800° C. within the fluid bearing device. In some embodiments, the heated enclosure may be a furnace. In some embodiments, the heated enclosure is the slow cooling device.

When the fiber is cooled at process temperatures below the near-$T_g$ region (e.g. at temperatures below 1000° C.), the structure of the glass and/or state of the fiber is kinetically quenched and essentially invariant (on practical time scales) as the available thermal energy is less than the energy needed to relax or otherwise modify the glass to effect structural relaxation or a closer approach to an equilibrium state. In the exemplary system configuration of FIG. 4, however, fluid bearing devices are counterproductive to the objective of achieving fibers with low fictive temperature. Instead of enabling controlled cooling at slow rates, fluid bearing devices facilitate rapid cooling of the fiber due to the fluid in the fluid bearing device contacting the optical fiber. As the optical fiber is transported over the fluid bearing devices, the region of levitating fluid cushion on each fluid bearing acts to rapidly cool the optical fiber. Because the levitating fluid stream employed by the fluid bearing device to support and seat the fiber is in motion, the optical fiber is cooled at a rate that is significantly faster than the fiber would cool in quiescent air at room temperature. The greater the temperature differential between the optical fiber and the levitating fluid in the fluid bearing, the greater the ability of the levitating fluid bearing to cool the optical fiber. The levitating fluid supplied to fluid bearings is air or an inert gas at room temperature. In order to support and levitate the fiber to prevent mechanical contact of the fiber with the fluid bearing device, the velocity of the levitating fluid supplied to channel is high. The use of such high levitating fluid flow velocities greatly increases the rate of cooling of the fiber through convective processes. The larger the difference between the temperature of the fiber and the temperature of the levitating fluid being supplied by the fluid bearing device, and the higher the levitating fluid flow velocity, the faster the rate of cooling of the fiber. In the fiber processing systems of the prior art, the levitating fluid supplied by fluid bearing devices is at room temperature and the fiber exiting the slow cooling device and entering the assembly of fluid bearing devices is typically at a temperature of 800° C. or higher, and more typically at a temperature of 1000° C. or higher. At typical fiber draw speeds and typical levitating fluid velocities through the fluid bearing device, the temperature of the fiber can be reduced by several hundred to over 1000° C. over a length of 1-2 m as the fiber passes over a fluid bearing device. Typical temperatures of fibers exiting a fluid bearing device are in the range from 23° C. to 600° C. or in the range from 50° C. to 800° C. Fibers exiting the fluid bearing device may be directed to a reheating stage for heating to a temperature above the exit temperature from the fluid bearing device. The temperature of fibers entering a reheating stage may be in the range from 23° C. to 600° C. or in the range from 50° C. to 800° C. The present system includes a reheating stage after the fiber exits a fluid bearing device and prior to it reentering the slow cooling device for the second time (or for reentry into the slow cooling device any time after that) for returning a cooled fiber to a temperature at or above 1000° C. during processing. In one embodiment, the fiber is a silica or doped silica fiber drawn from a preform which passes through a slow cooling device operating at a temperature between 1000° C. and 1400° C., cools to below 600° C., and is reheated in a stage to fiber temperatures above 1000° C. prior to it reentering back into the said slow cooling device. By reheating the fiber, the time at which the fiber temperature persists in the window between 1000° C. and 1700° C. is extended, and subsequent cooling permits further reduction in the fictive temperature of the fiber. The present system and method may include traversing the optical fiber multiple times (e.g. >2, >3, >5 . . . ) through the same slow cooling device using at least two fluid bearing devices, each having multiple channels. The method involves multiple cycles of cooling the fiber to a fiber temperature below 600° C. inside a channel of a fluid bearing device and reheating it in a stage to increase the fiber temperature above 1000° C. to further extend the time at which the fiber is at fiber temperature in the slow cooling device between 1000° C. and 1700° C. to permit further reductions in the fictive temperature. The present system may also include fluid bearing or other fiber-turning devices having multiple channels for redirecting the path of the fiber through the processing system to permit multiple passes of the fiber through a single slow cooling device that extends the time extend the time at which the fiber is at fiber temperature in the slow cooling device between 1000° C. and 1700° C. to permit further reductions in the fictive temperature while minimizing the need for impractical vertical process headspace or use of additional slow cooling devices along the processing path. Reheating stage provides heat to the optical fiber through a convective, radiative, or electromagnetic mechanism. Reheating stage may be a furnace and may operate through heating elements or by flowing a hot gas or a flame over the fiber. Alternatively, reheating stage may include a laser, a plasma source or other optical source for heating fiber. The laser or other optical source may operate at a wavelength absorbed by fiber and transfer energy to fiber through absorption. The plasma source may beat up the plasma gas and heat the fiber through conduction. Inclusion of reheating stages in folded process pathways is advantageous because as the fiber is redirected by a fiber-turning device, it cools rapidly. The temperature of a silica fiber upon emergence from a fiber-turning device is typically in the range from 50° C. to 600° C. Reheating reverses the cooling and raises the temperature of the fiber to a degree sufficient to control the fictive temperature as described herein. In another embodiment, the chamber of the reheating stage is heated to a temperature and the one or more fiber-turning devices comprising multiple channels are positioned within the chamber in a configuration that extends the process pathway through the reheating stage. In this embodiment, the chamber of the reheating stage is heated to a temperature greater than the temperature of the fiber and the fiber is heated as it passes through the chamber. The temperature of the interior of the reheating stage may be spatially uniform or spatially varying. In one embodiment, the temperature of the interior of the reheating stage is monotonically increasing in the direction of fiber conveyance, where the peak temperature within the interior is greater than the temperature of the fiber as it enters the reheating stage. In another embodiment, the temperature of the interior of the reheating stage is monotonically decreasing in the direction of fiber conveyance, where the peak temperature within the interior is greater than the temperature of the fiber as it enters the reheating stage.

The fluid bearing device 422 advantageously enables the bare optical fiber to be directed through a slow cooling device multiple times, thereby allowing for increased residence time in the glass transition region without requiring additional cooling devices on subsequent legs of the fiber draw system. Increased residence time in the glass transition region allows for increased relaxation of the glass and results in significantly lowering of optical fiber Rayleigh scattering and attenuation.

In some embodiments, the temperature of the optical fiber leaving the fluid bearing device is between 300° C. and 800° C., preferably between 500° C. and 800° C., more preferably between 700° C. and 800° C. After exposure to the process temperature for a residence time of at least 0.4 seconds, the bare optical fiber is directed to coating unit 128, at which a coating is applied to provide a coated fiber 130. After exiting coating unit 128, coated optical fiber 130 may go through a variety of other processing stages within the system that are known in the art (not shown). Drawing mechanisms 132 that are known in the art are used to provide tension on the optical fiber as it is drawn through system 400.

Figure 5:
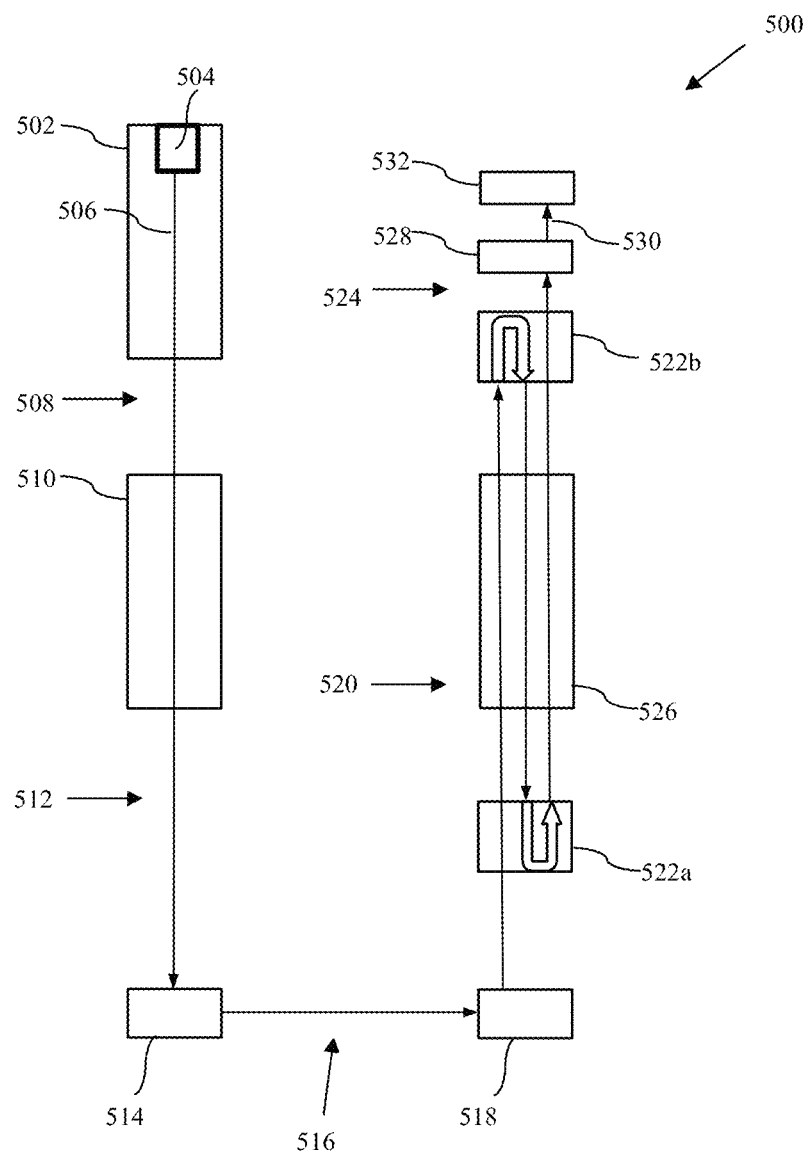
FIG. 5 illustrates an exemplary optical fiber production system in accordance with some embodiments of the current disclosure.

FIG. 5 depicts another exemplary system (500) for processing a bare optical fiber in accordance with some embodiments of the current disclosure. The system 500 comprises a draw furnace (502) containing an optical fiber preform (504). A bare optical fiber (506) is drawn from the optical fiber preform 504. The fiber preform 504 is heated in a furnace 502 and the bare optical fiber 506 drawn therefrom extends from the draw furnace 502 along a process pathway (508).

A first slow cooling device (510) is operatively coupled to and downstream from the draw furnace 502 along a first segment (512) of the process pathway 508. The first slow cooling device 510 exposes the bare optical fiber to a process temperature in the range from 1000° C. to 1400° C. for a residence time of at least 0.1 seconds. Unlike the exemplary system 400 depicted in FIG. 4, exemplary system 500 does not redirect the bare optical fiber through the first slow cooling device.

A first fluid bearing device 514 is operatively coupled to and downstream from the first cooling device 510 along the first segment 512 of the process pathway 508. The first fluid bearing device 514 redirects the bare optical fiber 504 from the first segment 512 of the process pathway 108 to a second segment 516 of the process pathway.

A second fluid bearing device 518 is operatively coupled to and downstream from the first fluid bearing device 514 along the second segment 516 of the process pathway 108. The second fluid bearing 518 device redirects the bare optical fiber 504 from the second segment 516 of the process pathway 508 to a third segment 520 of the process pathway

508. The bare optical fiber 504 is cooled to a temperature in the range from 400° C. to 500° C. at a beginning of the third segment.

A second slow cooling device 526 is operatively coupled to and downstream from the second fluid bearing device 518 along the third segment 520 of the process pathway 508. The second slow cooling device 526 exposes the optical fiber to a process temperature in the range from 1000° C. to 1400° C.

Two fluid bearing devices 522a, 522b having multiple support channels are operatively coupled to the second slow cooling device 526 along the third segment 520 of the process pathway 508. The two fluid bearing devices 522a, 522b redirect the bare optical fiber 504 through the second slow cooling device 526 at least two times.

Following the second cooling device, the bare optical fiber is directed to coating unit 528 along a fourth segment 524 of the process pathway, at which a coating is applied to the fiber. After exiting coating unit 528, coated optical fiber 530 may go through a variety of other processing stages within the system that are known in the art (not shown). Drawing mechanisms 532 that are known in the art are used to provide tension on the optical fiber as it is drawn through system 500.

Figure 6:
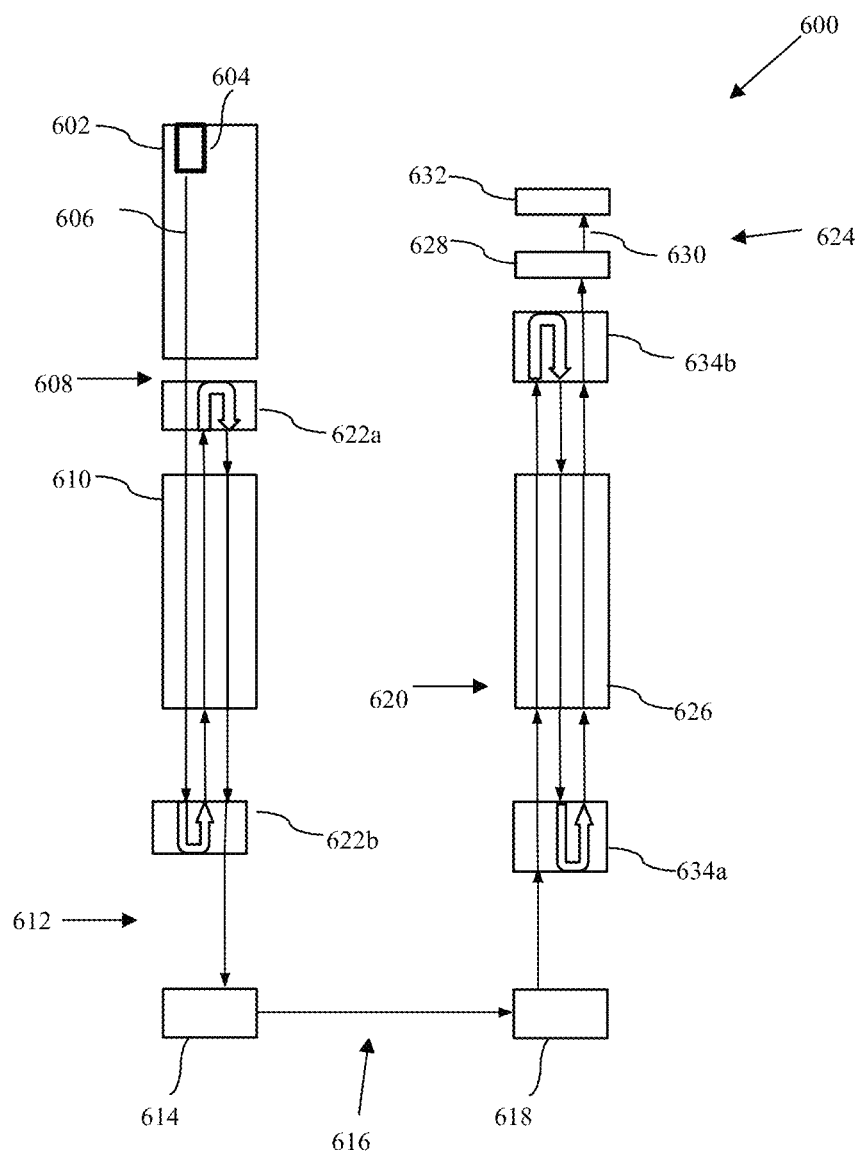
FIG. 6 illustrates an exemplary optical fiber production system in accordance with some embodiments of the current disclosure.

FIG. 6 depicts another exemplary system 600 for processing a bare optical fiber in accordance with some embodiments of the current disclosure. The system 600 comprises a draw furnace 602 containing an optical fiber preform 604. A bare optical fiber 606 is drawn from the optical fiber preform 604. The fiber preform 604 is heated in a furnace 602 and the bare optical fiber 606 drawn therefrom extends from the draw furnace 602 along a process pathway 608.

A first slow cooling device 610 is operatively coupled to and downstream from the draw furnace 602 along a first segment 612 of the process pathway 608. The slow cooling device 610 exposes the bare optical fiber 606 to a process temperature in the range from 1000° C. to 1400° C.

Two fluid bearing devices 622a, 622b having multiple support channels are operatively coupled to the first slow cooling device 610 and downstream from the draw furnace 602 along the first segment 612 of the process pathway 608. The two fluid bearing devices 622a, 622b redirect the bare optical fiber 606 through the first slow cooling device 610 at least two times, where the bare optical fiber 606 is exposed to a process temperature in the range from 1000° C. to 1400° C.

A first fluid bearing device 614 is operatively coupled to and downstream from the first cooling device 610 along the first segment 612 of the process pathway 608. The fluid bearing device 614 redirects the bare optical fiber 606 from the first segment 612 of the process pathway 608 to a second segment 616 of the process pathway 608.

A second fluid bearing device 618 is operatively coupled to and downstream from the first fluid bearing device 614 along the second segment 616 of the process pathway 608. The second fluid bearing 618 device redirects the bare optical fiber 606 from the second segment 616 of the process pathway 608 to a third segment 620 of the process pathway 608. The bare optical fiber 606 is cooled to a temperature in the range from 400° C. to 500° C. at a beginning of the third segment.

A second slow cooling device 626 is operatively coupled to and downstream from the second fluid bearing device 618 along the third segment 620 of the process pathway 608. The second slow cooling device 626 exposes the optical fiber to a process temperature in the range from 1000° C. to 1400° C.

Two fluid bearing device 634a, 634b having multiple support channels are operatively coupled to and downstream from the second fluid bearing device 618 along the third segment 620 of the process pathway 608. The two fluid bearing devices 634a, 634b redirects the bare optical fiber 606 through the second slow cooling device 626 at least two times, where the bare optical fiber 606 is exposed to a process temperature in the range from 1000° C. to 1400° C.

Following completion of the residence time within the second cooling device, the bare optical fiber is directed to coating unit 628, along a fourth segment 624 of the process pathway at which a coating is applied to provide a coated fiber 630. After exiting coating unit 628, coated optical fiber 630 may go through a variety of other processing stages within the system that are known in the art (not shown). Drawing mechanisms 632 that are known in the art are used to provide tension on the optical fiber as it is drawn through system 600.

The attenuation of optical fibers prepared using the systems and methods described herein may be less than 0.18 dB/km at 1550 nm, preferably less than 0.17 dB/km at 1550 nm, more preferably less than 0.16 dB/km at 1550 nm.

EXAMPLES

Figure 8:
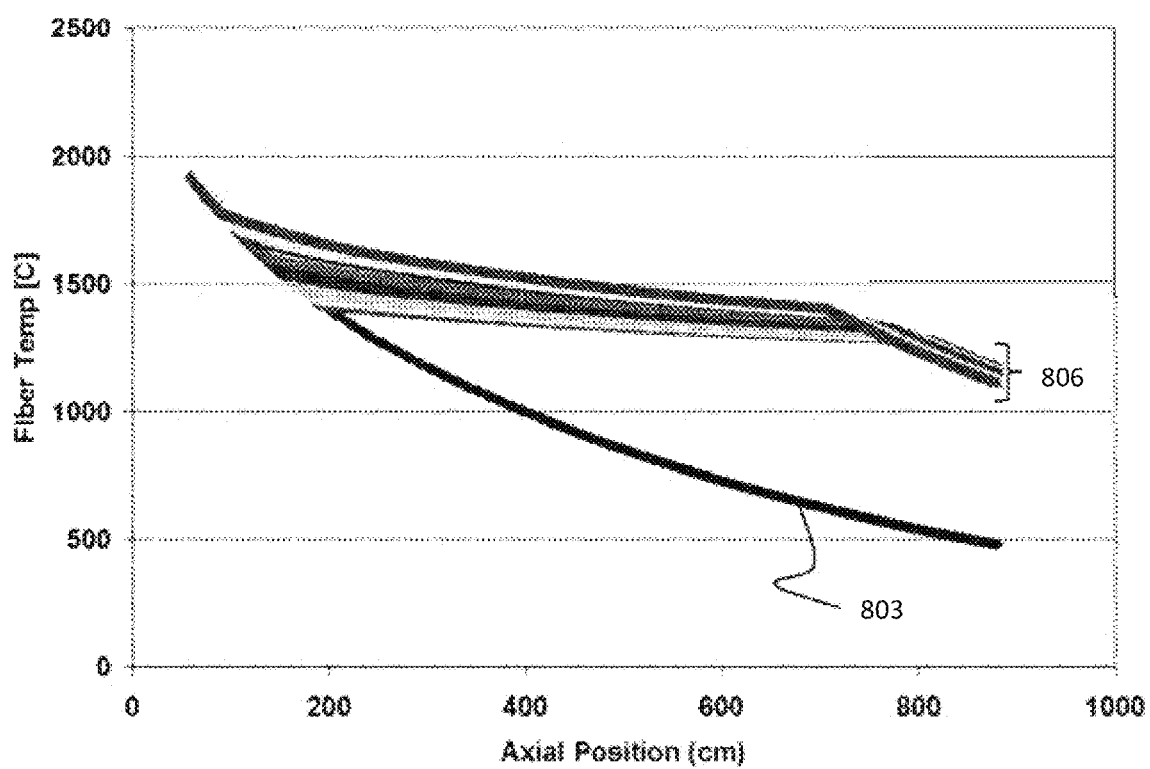
FIG. 8 illustrates the effect of slow cooling on the temperature of a silica fiber.

FIG. 8 illustrates the effect of a slow cooling device on the temperature of a silica fiber for a system configuration that includes a draw furnace and a slow cooling device operatively coupled to the draw furnace without an intervening reheating stage. The fiber is drawn from a preform in the draw furnace and delivered directly to the slow cooling device. FIG. 8 shows fiber temperature as a function of axial position along the fiber, where axial position increases in the direction away from the draw furnace along the process pathway. Curve 803 is a reference trace that shows the temperature profile of the file in the absence of a slow cooling device. The series of curves depicted as 806 are traces that illustrate the temperature of the fiber as controlled by a slow cooling device positioned downstream from the draw furnace. The slow cooling device is maintained at a fixed temperature of 1200° C. The different traces correspond to different separations between the entrance of the slow cooling device and the draw furnace. The separations range from 0 mm to 1030 mm. Traces 806 illustrate that inclusion of a slow cooling device in the processing system extends the length along the fiber for which the fiber is exposed to processing temperatures above 1000° C. In the absence of a slow cooling device, trace 803 shows that the fiber temperature decreases to below 1000° C. in a short distance along the length of the fiber. With the slow cooling device, the length over which the fiber remains above 1000° C. is greatly extended. Since the fiber is being conveyed at a pre-determined speed during processing, length along the fiber correlates with the time period over which the fiber is exposed to processing temperatures sufficient to cause the time period over which the fiber temperature remains above 1000° C. Inclusion of the slow cooling device greatly extends the time period over which the fiber temperature remains above 1000° C. during cooling.

Figure 9:
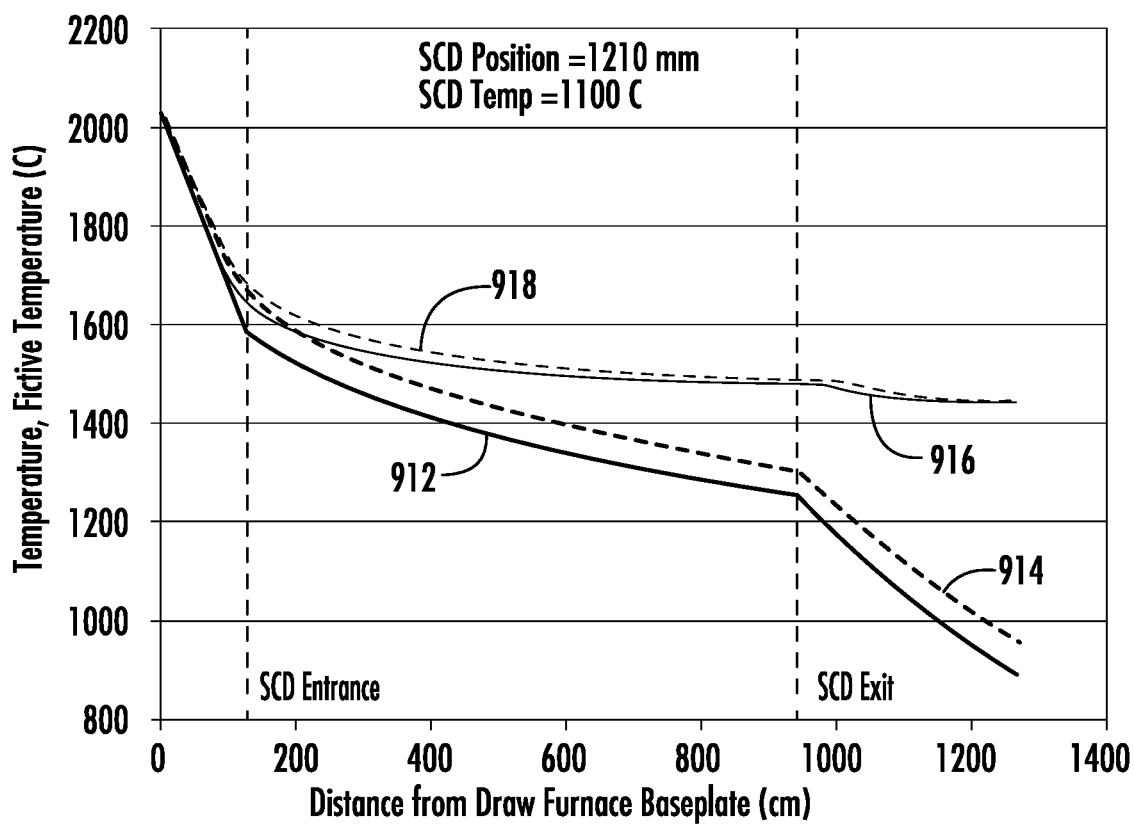
FIG. 9 illustrates the effect of slow cooling on fictive temperature of a silica fiber for two draw speeds.

FIG. 9 shows the effect of slow cooling on the fictive temperature of a silica fiber for draw speeds of 42 m/s and 50 m/s. The system configuration used in FIG. 9 includes a slow cooling device operatively coupled to a draw furnace with no intervening devices. The fiber is drawn from a preform in the draw furnace and conveyed directly to and through a slow cooling device at a draw speed of 42 m/s or 50 m/s. The slow cooling device is kept at a uniform temperature of 1100° C. The entrance of the slow cooling device ("SCD") is positioned along the process pathway 121 cm downstream from the exit (baseplate) of the draw furnace. The entrance and exit positions of the slow cooling device relative to the baseplate of the draw furnace are indicated in FIG. 9. Traces 912 and 914 show the variation in the temperature of the fiber with distance from the baseplate of the draw furnace at draw speeds of 42 m/s and 50 m/s, respectively. The temperature of the fiber decreases as it passes through the slow cooling device, but the rate of cooling is much less than the rate of cooling in air. The rate of cooling of the fiber increases significantly upon exit of the fiber from the slow cooling device and the fiber temperature decreases over a correspondingly shorter distance along the process pathway. Traces 916 and 918 show the variation in the fictive temperature of the fiber with distance from the baseplate of the draw furnace at draw speeds of 42 m/s and 50 m/s, respectively. The fictive temperature of silica fiber cooled directly in air is 1550° C. The results shown in FIG. 9 indicate that conveyance of the fiber through a slow cooling device reduces the fictive temperature of the fiber to 1500° C.

Figure 10:
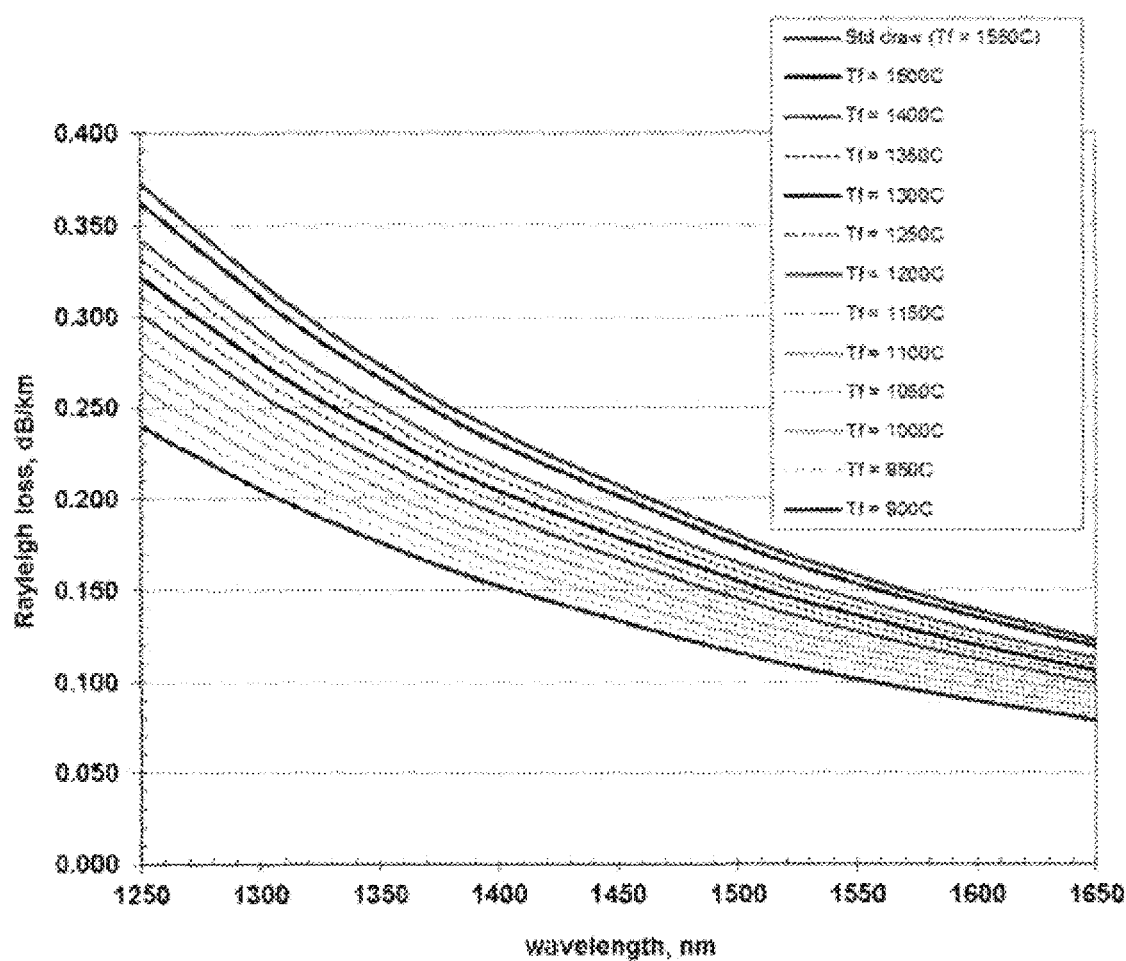
FIG. 10 illustrates the dependence of Rayleigh scattering loss on wavelength for a series of silica fibers that differ in fictive temperature.

FIG. 10 illustrates the modeled effect of fictive temperature ($T_f$) on Rayleigh scattering loss for silica fiber. Rayleigh scattering is the primary contribution to attenuation over the wavelength range indicated. The plot shows the Rayleigh scattering loss as a function of wavelength for silica fibers having fictive temperatures that range from 900° C. to 1550° C. The uppermost trace shows Rayleigh scattering loss for a fiber prepared in a standard air-cooled draw process without inclusion of a slow cooling device. Fibers prepared by the standard air-cooled draw process have a fictive temperature of about 1550° C. The remaining traces are ordered in descending order of fictive temperature, where fictive temperature decreases as indicated in the legend. The lowermost trace corresponds to a fiber having a fictive temperature of 900° C. The traces demonstrate a decrease in Rayleigh scattering loss as the fictive temperature of the fiber decreases. The lowest attenuation was observed in the fiber having a fictive temperature of 900° C. and the highest attenuation was observed in the fiber having a fictive temperature of 1550° C. Intermediate levels of attenuation were observed for fibers having fictive temperatures between 900° C. and 1550° C. Attenuation was observed to consistently decrease throughout the indicated wavelength range as the fictive temperature of the fiber decreased.

Figure 11:
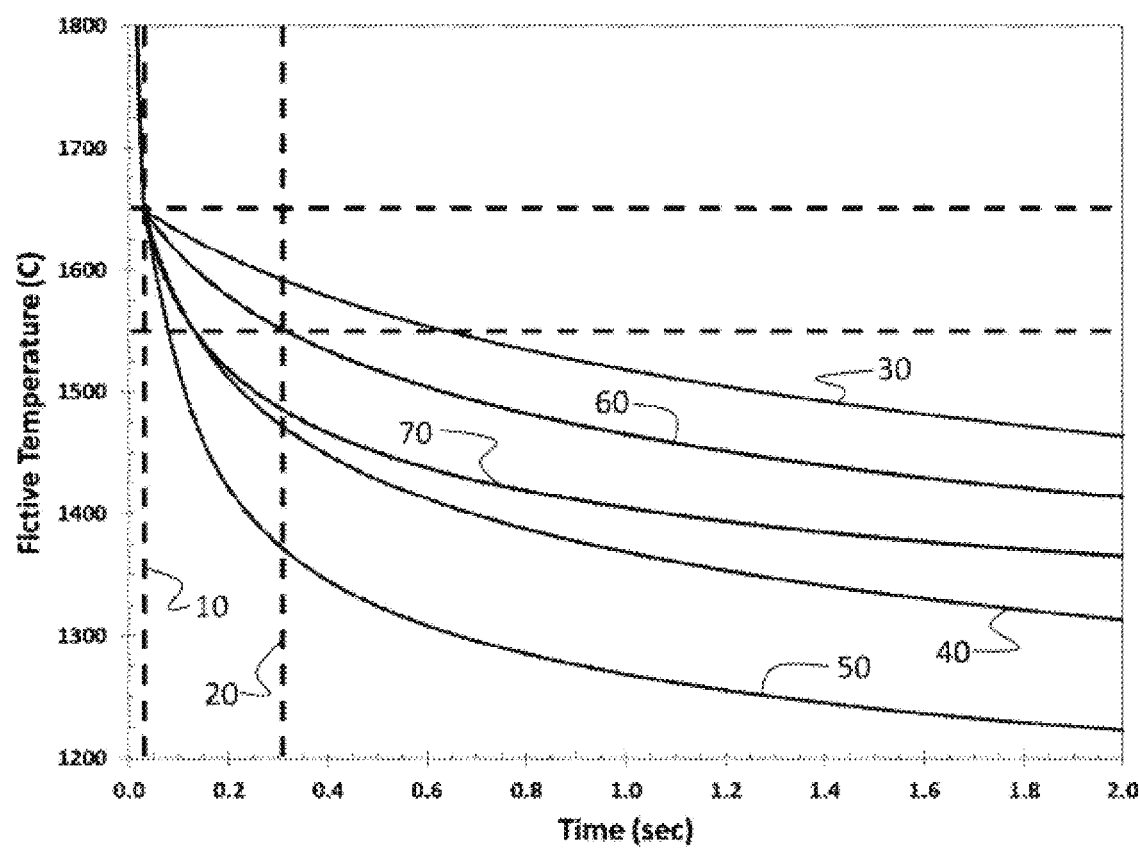
FIG. 11 shows the variation in fictive temperature of a silica fiber with residence time (up to 2 sec) of the fiber in a processing system with furnaces at operated at constant temperatures ranging from 900° C. to 1300° C.
Figure 12:
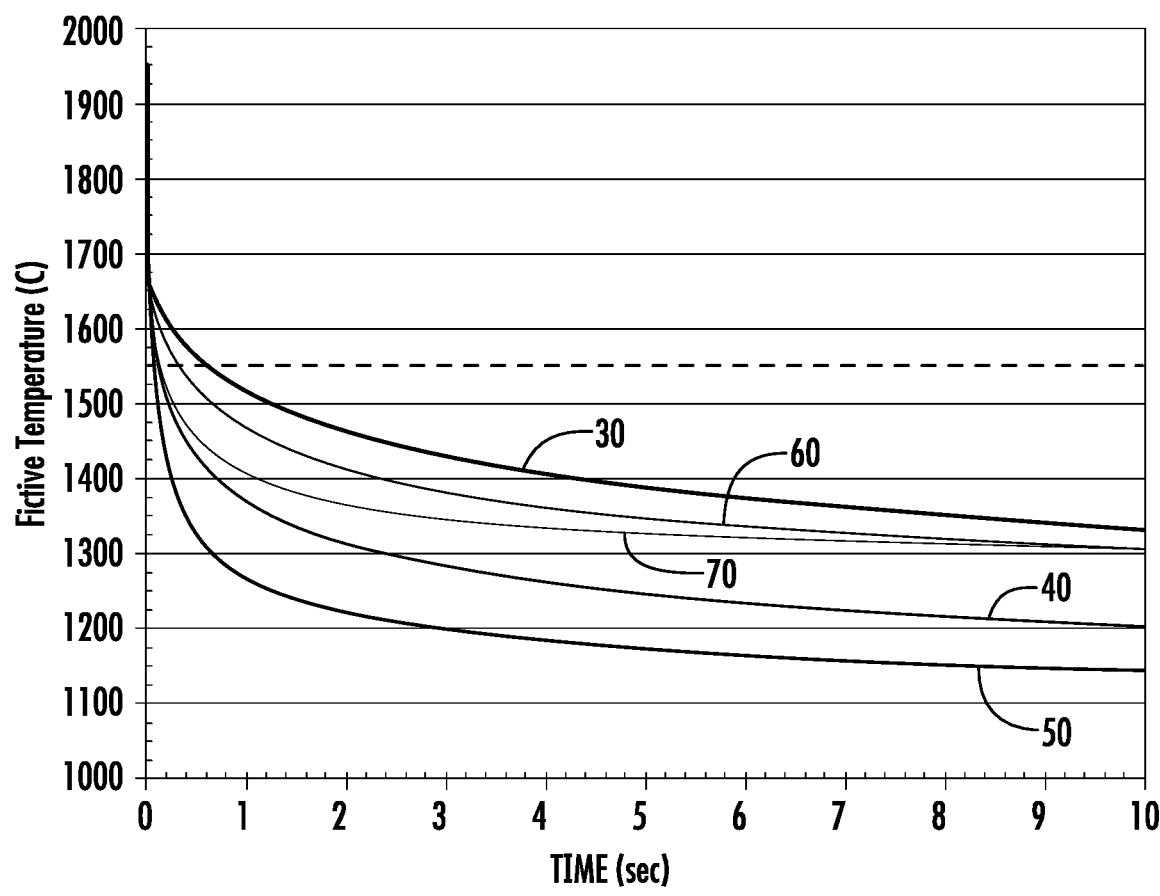
FIG. 12 shows the variation in fictive temperature of a silica fiber with residence time (up to 10 sec) of the fiber in a processing system with furnaces at operated at constant temperatures ranging from 900° C. to 1300° C.; and The embodiments set forth in the drawings are illustrative in nature and not intended to be limiting of the invention defined by the claims. Moreover, individual features of the drawings and the invention will be more fully apparent and understood in view of the detailed description.

FIG. 11 illustrates the modeled variation in fiber fictive temperature as a function of residence time in furnaces set at various temperatures for silica fibers processed in a fiber draw system in accordance with the present description. The residence time at a particular temperature or temperature range can be controlled through the arrangement, spacing, and number of fluid bearing devices as described herein. Many possible system configurations can be employed to achieve a desired residence time. In the model, the fiber was taken to exit the draw furnace at time t=0.02 sec and enter the furnace at time 0.03 sec (depicted as dashed line 10). The temperature of the fiber as it entered the furnace was about 1650° C. In the model, the heated region of the furnace was maintained at a constant temperature. Traces 30, 40, 50, 60, and 70 show the variation in fiber fictive temperature as a function of time in the furnace for furnaces operated at constant temperatures of 900° C., 1000° C., 1100° C., 1200° C., and 1300° C.; respectively. The results indicate that the fictive temperature of the fiber decreases with increasing time in the furnace. Dashed line 20 marks a residence time of about 0.2 sec in furnaces set at each of the constant operating temperatures. The residence time of about 0.2 sec is typical of prior art fiber processing system. The data shown in FIG. 11 indicate that the fiber fictive temperature continues to decrease with increasing residence time beyond 0.2 sec in the furnace. For residence times of 2 sec, the fiber fictive temperature is less than the fiber fictive temperature observed at a residence time of 0.2 sec by 100° C. or more. FIG. 12 shows an extension of the data presented in FIG. 11 to residence times up to 10 sec for each furnace temperature. Data curves and labels shown in FIG. 12 correspond to those shown in FIG. 11.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A system for processing an optical fiber comprising:
a draw furnace, said draw furnace containing an optical fiber preform;
a bare optical fiber drawn from said optical fiber preform, said bare optical fiber extending from said draw furnace along a process pathway;
a slow cooling device operatively coupled to and downstream from said draw furnace, said slow cooling device exposing said bare optical fiber to a slow cooling device process temperature in the range from 1000° C. to 1400° C.;
at least one fluid bearing device operatively coupled to and downstream from said draw furnace, the at least one fluid bearing device redirecting said bare optical fiber to reenter the slow cooling device.

2. The system of claim 1, wherein the at least one fluid bearing device comprises a body having multiple support channels configured to redirect said bare optical fiber to reenter the slow cooling device.

3. The system of claim 1, further comprising at least one more fluid bearing device, wherein the fluid bearing devices are configured to redirect said bare optical fiber through the slow cooling device to expose said bare optical fiber to the slow cooling device process temperature for a residence time of at least 0.4 seconds.

4. The system of claim 1, wherein the bare optical fiber has a temperature within the slow cooling device of 1000° C. to 1700° C. for at least 0.2 seconds.

5. The system of claim 1, wherein the system is configured to increase the temperature of the bare optical fiber by at least 500° C. after the bare optical fiber is redirected by the fluid bearing device and prior to the bare optical fiber reentering the slow cooling device.

6. The system of claim 1, wherein the temperature of the at least one fluid bearing device is between 5° C. and 450° C.

7. The system of claim 1, wherein the temperature of the optical fiber leaving the at least one fluid bearing device is between 300° C. and 800° C.

8. The system of claim 1, wherein the system is configured such that the optical fiber processed by the system has an attenuation of less than 0.18 dB/km at 1550 nm.

9. The system of claim 1, wherein said at least one fluid bearing device is within a heated enclosure.

10. The system of claim 1, wherein said optical fiber is exposed to a process temperature above 400° C. within said at least one fluid bearing device.

* * * * *